(12) United States Patent
Moehlenkamp et al.

(10) Patent No.: US 9,124,119 B2
(45) Date of Patent: Sep. 1, 2015

(54) SYSTEM FOR GENERATING ELECTRICAL POWER AND METHOD OF OPERATING THE SYSTEM

(75) Inventors: Georg Moehlenkamp, Grossbeeren (DE); Siegfried Nowak, Berlin (DE)

(73) Assignee: GE Energy Power Conversion Technology Limited, Warwickshire (GB)

( * ) Notice: Subject to any disclaimer, the term of this patent is extended or adjusted under 35 U.S.C. 154(b) by 1091 days.

(21) Appl. No.: 12/929,990

(22) Filed: Mar. 1, 2011

(65) Prior Publication Data

US 2012/0032532 A1    Feb. 9, 2012

(30) Foreign Application Priority Data

Aug. 6, 2010 (EP) .................................. 10008210

(51) Int. Cl.
| | |
|---|---|
| *H02J 1/00* | (2006.01) |
| *H02J 3/00* | (2006.01) |
| *H02J 3/01* | (2006.01) |
| *H02P 9/48* | (2006.01) |
| *H02J 3/32* | (2006.01) |
| *H02J 3/38* | (2006.01) |

(52) U.S. Cl.
CPC ... *H02J 3/01* (2013.01); *H02J 3/00* (2013.01); *H02J 3/32* (2013.01); *H02J 3/381* (2013.01); *H02P 9/48* (2013.01); *Y02E 10/763* (2013.01)

(58) Field of Classification Search
CPC ............ H02J 3/00; H02J 3/01; Y02E 10/763; H02M 1/12; H02M 1/26; H02M 5/00; H02M 200/12
USPC ..................................................... 307/82, 151
See application file for complete search history.

(56) References Cited

U.S. PATENT DOCUMENTS

| | | |
|---|---|---|
| 2008/0174183 A1 | 7/2008 | Seki |
| 2009/0278350 A1 | 11/2009 | Moehlenkamp et al. |
| 2010/0156192 A1* | 6/2010 | Wang et al. ..................... 307/82 |

FOREIGN PATENT DOCUMENTS

| | | |
|---|---|---|
| EP | 2117108 A2 | 11/2009 |
| JP | 2000041338 A | 2/2000 |

OTHER PUBLICATIONS

The EP Office Action issued in connection with corresponding EP Patent Application No. 10008210.6 dated on Aug. 28, 2013.
European Search Report.

* cited by examiner

*Primary Examiner* — Carlos Amaya
(74) *Attorney, Agent, or Firm* — Parks Wood LLC

(57) ABSTRACT

A system for generating electrical power is described. In at least one embodiment, the system includes a turbine that is mechanically connected to a generator, wherein the generator is electrically connected via a first converter to a load. The first converter generates a first output current. A second output current is generated by a second converter and is added to the first output current. The second output current is generated such that an actual current over the load follows a desired current.

7 Claims, 1 Drawing Sheet

SYSTEM FOR GENERATING ELECTRICAL POWER AND METHOD OF OPERATING THE SYSTEM

PRIORITY STATEMENT

The present application hereby claims priority under 35 U.S.C. §119 on European patent application number EP 10 008 210.6-2207 filed Aug. 6, 2010 the entire contents of which are hereby incorporated herein by reference.

FIELD

At least one embodiment of the invention generally relates to a system for generating electrical power. More specifically, it relates to a system comprising a turbine that is mechanically connected to a generator, the generator being electrically connected via a first converter to a load, wherein the first converter generates a first output current. At least one embodiment of the invention also relates to a method of operating the system for generating electrical power.

BACKGROUND

US 2009/0278350 A1 is known. There, a synchronous generator with e.g. 20 windings is connected to a two-stage direct converter. During the start-up of the turbine, a number of windings of the generator are combined in order to increase the voltage at the windings. With the aid of this higher voltage, the generator may be operated to function as a motor and to increase the rotational speed of the turbine. During normal operation, the output current of the converter is controlled to a desired sinusoidal shape.

It is known to couple a filter circuit to the output of a converter. With the help of this filter circuit, it is possible to smooth the output current of the converter. However, standard filter circuits are bulky and costly.

SUMMARY

In at least one embodiment of the invention, a system for generating electrical power and/or a method of operating the system are provided, which do not have the disadvantages of standard filter circuits.

At least one embodiment of the invention is directed to a system and at least one embodiment of the invention is directed to a method.

According to at least one embodiment of the invention, a second converter is provided which generates a second output current which is added to the first output current wherein the second output current is generated such that an actual current over the load follows a desired current.

With the aid of the second output current, it is possible to adjust the first output current of the first converter such that it is smooth. At least one embodiment of the invention, therefore, has the advantage that a smooth output current is generated only with the second converter. No bulky or costly filter circuits are necessary. If at all, only small filter circuits may be added.

In particular, at least one embodiment of the invention provides the possibility to reduce harmonics of the current of a power supply grid. For that purpose, the second converter influences the actual current to the power supply grid such that it is smoothened with respect to the mentioned harmonics of the power supply grid.

In an advantageous embodiment of the invention, a difference between the first output current and the desired current is evaluated, wherein the second output current of the second converter is generated as a function of the difference. Furthermore, it is possible that the actual value of the difference is negated. These features provide a simple procedure how the second output current may be generated such that an actual current over the load follows a desired current.

In another advantageous embodiment of the invention, it is possible that, during start-up of the turbine, the first converter is supplied with a transformed voltage from the load. With this procedure, the second transformer may be used for different functions during normal operation and during start-up.

BRIEF DESCRIPTION OF THE DRAWINGS

Additional features, optional applications and advantages of embodiments of the invention are described in the following description of example embodiments of the invention which are represented in the figures of the drawing. All described or illustrated features by themselves or in any combination thereof form the subject matter of the invention, independent of how they are summarized in the patent claims or of how they are referenced back in the claims, as well as independent of their formulation and/or representation in the specification and/or the drawing.

DETAILED DESCRIPTION OF THE EXAMPLE EMBODIMENTS

Figure 1:
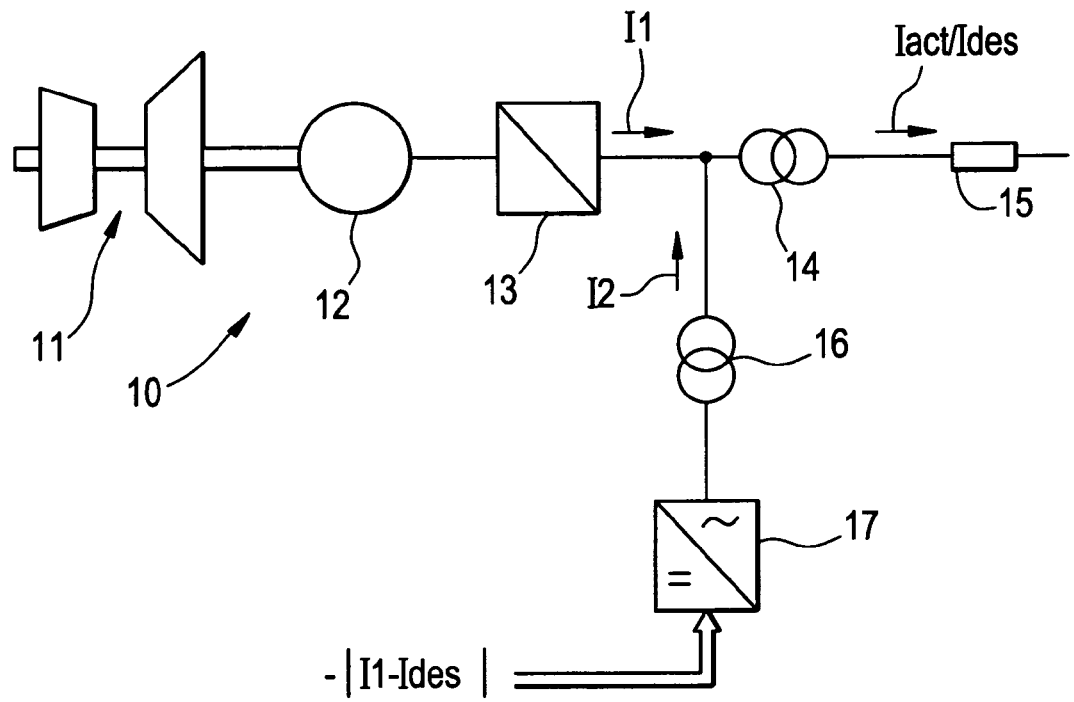
FIG. 1 shows a schematic one-phase block diagram of an example embodiment of a system according to an embodiment of the invention for generating electrical power.

Various example embodiments will now be described more fully with reference to the accompanying drawings in which only some example embodiments are shown. Specific structural and functional details disclosed herein are merely representative for the purpose of describing example embodiments. The present invention, however, may be embodied in many alternate forms and should not be construed as limited to only the example embodiment.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 shows a system 10 for generating electrical power. The system 10 includes a turbine 11 which is mechanically connected to a generator 12. The turbine 11 and the generator 12 are directly connected with no gear or the like in-between. The generator 12 is electrically connected to a first converter 13 which in turn is connected to a first transformer 14. The first transformer 14 is furthermore connected to an electric load 15, for example an electric power supply grid. The connection between the first converter 13 and the first transformer 14 is connected to a second transformer 16 which in turn is connected to a second converter 17.

The generator 12 may be a synchronous generator with a number of n windings, e.g. n=20. In particular, the generator 12 may be a synchronous generator with polygonal-shaped windings, e.g. as disclosed in US 2009/0278350 A1, the entire contents of which are hereby incorporated herein by reference. The converter 13 may be a matrix converter which can also be considered a two-stage direct converter. In particular, the converter 13 may be a converter as disclosed in US 2009/0278350 A1.

It is noted that—as alternative embodiments to FIG. 1—the first transformer 14 and/or the second transformer 16 may be omitted so that only the first transformer 14 or only the second transformer 16 or no transformer is present. Furthermore, it is noted that—as a further alternative embodiment—a filter circuit may be combined with the second transformer 16.

The first converter 13 generates a first output current I1 which is measured. The second converter 17 generates a second output current which is forwarded to the second transformer 16. The second transformer 16 outputs a current I2. The currents I1, I2 are added and constitute an actual current Iact over the load 15 which corresponds to a desired current Ides over the load 15.

In normal operation of the system 10, the turbine 11 is operated with fuel, e.g. with gas. The rotation of the turbine 11 leads to a rotation of the generator 12 so that the generator 12 produces an output voltage with a speed-dependant frequency. With the aid of the first converter 13, this voltage is converted to a voltage with fixed frequency, e.g. with the frequency of the energy supply grid. The output voltage of the first converter 13 is then transformed to a predetermined voltage by the first transformer 14, e.g. to the voltage of the power supply grid.

The second transformer 16 and the second converter 17 have the purpose to smooth the first output current I1 of the first converter 13. In particular, the second transformer 16 and the second converter 17 are provided to reduce harmonics of the current of the load 15, i.e. the power supply grid.

The operation of the second converter 17 is based on the comparison of the output current I1 with the desired current Ides as time variables or in the frequency domain.

A difference between the first output current I1 of the first converter 13 and the desired current Ides over the load 15 is evaluated. The result is the difference of the output current I1 and the desired grid current Ides, and the set point of the second converter 17 is the negation of this result. The second converter 17 then generates the second output current which is transformed into the current I2. Thus, the sum of the output current I1 of the first converter 13 and the output current I2 resulting from the second converter 17 leads to the desired current Ides, i.e the desired grid current.

The first output current I1 provided by the first converter 13 and the current I2 are added and then forwarded via the first transformer 14 as the actual current Iact over the load 15.

Due to the above-described kind of generation of the current I2, the sum of the first output current I1 being generated by the first converter 13, and the current I2 being output by the second transformer 16, matches the desired current Ides over the load 15. As a result, the actual current Iact over the load 15 follows the corresponding desired current Ides.

Figure 2:
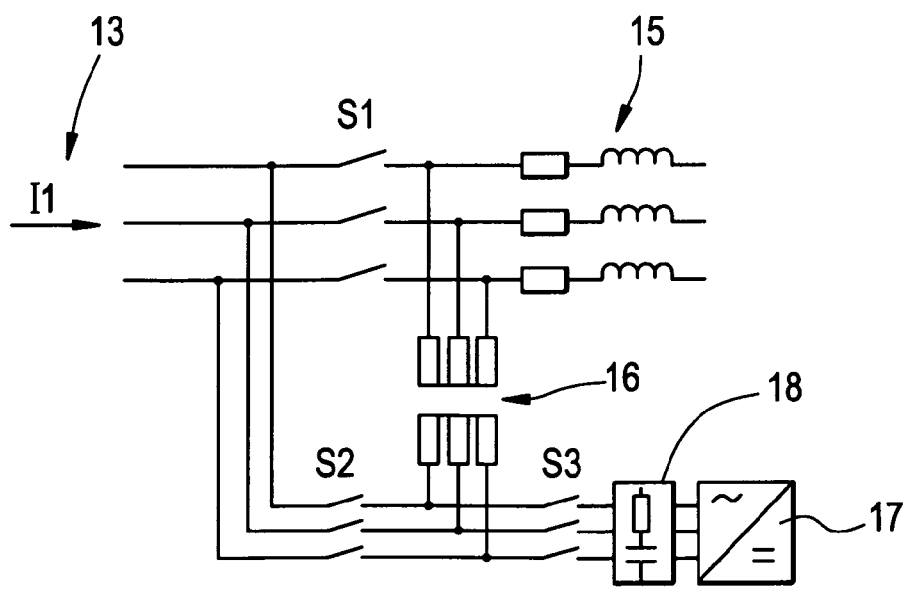
FIG. 2 shows a schematic three-phase block diagram of an extension of the system according to FIG. 1.

FIG. 2 shows an extension of the system 10 of FIG. 1. FIG. 2 shows the load 15 exemplified by resistors and inductances, the second transformer 16 and the second converter 17. In addition, FIG. 2 shows a filter circuit 18 exemplified as capacitors and inductances and being connected serially to the second converter 17. The first converter 13 of FIG. 1 is only schematically shown in FIG. 2, however, the first output current I1 of the first converter 13 is depicted in FIG. 2.

According to FIG. 2, the first converter 13 is coupled to the load 15 via a switch S1. As well, the first converter 13 is coupled to the filter circuit 18 and the second converter 17 via a serial connection of a second switch S2 and a third switch S3. Furthermore, according to FIG. 2, the second transformer 16 is located between the connection of the first switch S1 and the load 15 on one hand and the connection of the second switch S2 and the third switch S3 on the other hand.

In normal operation of the system 10, the first and the third switch S1, S3 are closed and the second switch S2 is opened. The first output current I1 of the first converter 13, therefore, is forwarded to the load 15 via the first switch S1 and the second converter 17 generates an output current which is forwarded to the load 15 via the filter circuit 18 and the third switch S3. The generation of the output current of the second converter 17 is carried out as described in connection with the generation of the current I2 of FIG. 1. As already mentioned, the filter circuit 18 of FIG. 2 may be omitted and a first transformer may be present in a serial connection with the load 15. Thus, the actual current over the load 15 follows the desired current as described in connection with FIG. 1.

During start-up of the turbine 11, the first and the third switch S1, S3 are opened and the second switch S2 is closed. The first converter 13 is supplied with a transformed voltage from the load 15, i.e. from the power supply grid. The second converter 17, however, does not influence the load 15 as it is switched off. Under these conditions, the second transformer 16 is used during start-up to reduce the voltage which acts upon the first converter 13.

With this reduced voltage, the turbine 11 may be started and accelerated with the help of the generator 12 by using the generator 12 as an electrical motor. The reduced voltage which is based on the voltage of the load 15, e.g. the voltage of the power supply grid, and which is then reduced by the second transformer 16, is converted by the first converter 13 and is then supplied to the generator (motor) 12. Thus, the generator 12 is operated as a motor and accelerates the turbine 11.

After reaching a preselected rotational speed of the turbine 11, all switches S1, S2, S3 are opened for a moment, e.g. for 2 to 5 seconds. Then, the first switch S1 and the third switch S3 are closed to enter the normal operation of the system 10.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A system for generating electrical power for a load, comprising:
   a first converter connected with the load and configured to output a first output current to be measured;
   a second converter connected between the first converter and the load, and configured to receive a difference current, the difference current being responsive to a comparison between the first output current as measured and a predetermined desired current to be supplied to the load, and output a second output current based on the difference current received;
   wherein
   the first output current and the second output current are added together to produce an actual current equal to the predetermined desired current.

2. The system of claim 1, wherein
   wherein the actual current is supplied to the load.

3. The system of claim 1, wherein the first output current as measured and the predetermined desired current signal are compared as time variables.

4. The system of claim 1, further comprising a first transformer coupled between an output of the first converter and the load.

5. The system of claim 4, further comprising a second transformer coupled between an output of the second converter and an input of the first transformer.

6. The system of claim 5, wherein the first converter is connected to the first transformer via a first switch, wherein the first converter is connected to the second converter via a serial connection of a second switch and a third switch, and wherein the second transformer is located between the connection of the first switch and the load and the connection of the second switch and the third switch.

7. The system of claim 6, wherein, during a normal operation, the first switch and the third switch are closed and the second switch is opened, and wherein, during a start-up operation, the first switch and the third switch are opened and the second switch is closed.

* * * * *